United States Patent [19]

Vorndran

[11] 4,292,560

[45] Sep. 29, 1981

[54] TACHOMETER GENERATOR BRUSH CARRIER

[75] Inventor: Albin Vorndran, Bad Neustadt, Fed. Rep. of Germany

[73] Assignee: Siemens Aktiengesellschaft, Munich, Fed. Rep. of Germany

[21] Appl. No.: 5,583

[22] Filed: Jan. 22, 1979

[30] Foreign Application Priority Data

Feb. 3, 1978 [DE] Fed. Rep. of Germany ....... 2804681

[51] Int. Cl.[3] ....... H02K 13/00

[52] U.S. Cl. ....... 310/242; 310/245

[58] Field of Search ....... 310/239, 177, 171, 238, 310/240.42, 241, 242, 245, 246, 247

[56] References Cited

U.S. PATENT DOCUMENTS

| | | | |
|---|---|---|---|
| 3,475,635 | 10/1969 | Mabuchi | 310/238 |
| 3,617,786 | 11/1971 | Stielper | 310/247 |
| 3,656,018 | 4/1972 | Maher | 310/242 |
| 3,714,481 | 1/1973 | Dijkstra | 310/246 |
| 3,784,856 | 1/1974 | Preston | 310/239 |
| 3,867,659 | 2/1975 | Seaburg | 310/242 |
| 3,967,148 | 6/1976 | Walsh | 310/239 |

FOREIGN PATENT DOCUMENTS

| | | | |
|---|---|---|---|
| 1148646 | 5/1963 | Fed. Rep. of Germany | 310/239 |
| 1936117 | 1/1971 | Fed. Rep. of Germany | 310/239 |

*Primary Examiner*—R. A. Skudy
*Attorney, Agent, or Firm*—Kenyon & Kenyon

[57] ABSTRACT

A tachometer generator for DC motors in which a brush carrier of insulating material is fastened to the tachometer housing at the end face. Brush holders are arranged on the brush carrier which, together with parts of the brush carrier, form a brush guides. A carbon brush and an associated coil spring is inserted into each brush guide and the coil spring is braced against an abutment of the brush holder. In order to simplify assembly of the brush holder and to improve the current transfer between the brush holder and the coil spring, a channel is formed on the brush carrier as a guide for each brush. The body of the brush holder has the shape of a plate and rests on the channel, forming a brush guide which is enclosed on all sides. Spreading arms are formed on the brush holder which snap into lateral cutouts alongside of the channel of the brush carrier. The coil spring is firmly connected to the brush holder by soldering.

4 Claims, 4 Drawing Figures

TACHOMETER GENERATOR BRUSH CARRIER

BACKGROUND OF THE INVENTION (a) Field of the Invention

This invention relates to a tachometer generator having a brush carrier of insulating material fastened to the tachometer housing at the end face on which at least two brush holders, acting with the carrier, form brush guides. A carbon brush provided with a coil spring is inserted into the brush guide and the coil spring is braced against an abutment of the brush holder. An electric wire can be connected to the brush holder.

(b) Description of the Prior Art

Tachometer generators of this general type are assembled to commerically available DC motors. In such tachometer generators, a clamp-shaped brush holder is riveted to the brush carrier and the carbon brush is guided between the clamp bracket and the brush carrier. Radially extending strips which are angled off toward each other at their free ends are formed on the clamp bracket. The ends of the two angled-off strips overlap. There is an axial gap between the angled-off ends and the brush carrier into which an angled-off projection of a contact plate connected to the coil spring extends, securing the coil spring in the axial direction. In this brush arrangement, the electric current is transmitted via the contact plate of the coil spring to the angled-off end of the strips of the brush holder and from there, to an electric wire connected to the brush holder. The contact plate is pushed by the force of the spring against the angled-off ends of the strips, serving as an abutment, and contact is thus established.

It is an object of the invention to provide a tachometer generator in which the brush holder can be assembled more easily than that just described and in which at the same time, the contact between the abutment of the brush holder and the coil spring is improved.

SUMMARY OF THE INVENTION

The foregoing problem is solved in accordance with the teachings of the invention in a tachometer generator of the type described above by providing channels formed on the brush carrier which serve individually as brush guides for each brush. Cutouts are provided in the brush carrier at two locations on the outer longitudinal sides of each channel for receiving parts of the brush holder. A plate-shaped brush holder having resilient spreading arms pointing axially toward and into engagement with the cut-outs in the brush carrier rests on each channel. Also, the brush holder has an abutment to which the coil spring of the brush is firmly connected. The channelled part of the brush carrier enables the brush holder, together with the carbon brush, to be fastened to the brush carrier with the carbon brush guided in the channel when the brush holder is attached. The joint attachment of the brush holder and the carbon brush makes it possible to connect the coil spring to the brush holder firmly by soldering, for instance, ensuring trouble-free current transfer. Because of the large contact surface provided by the channel, the brush holder may be fastened securely to the brush holder by means of a snap-on connection.

In a first embodiment, a particularly simple snap-on connection is obtained when the spreading arms are inclined outward at an angle to the direction of assembly and each has an outward angled-off portion extending parallel to the plate-shaped part of the brush holder. When the brush holder is assembled to the brush carrier, the spreading arms are pressed together far enough for the angled-off portions to lie over the cut-outs. From this position, the angled-off portions of the brush holder can be pushed through the cut-outs. The spreading arms are then released and the angled-off parts extend laterally behind the brush carrier on either side of the cut-outs and thereby secure the brush holder.

In an alternative embodiment, the snap-on connections on either side of each channel are each formed of two semicircular arm sections which face each other on the spreading arms. With this design, the cut-outs for enclosing the spreading arms need only be simple drill holes. Insertion into the holes compresses the semicircular arm sections slightly; they are therefore seated firmly in the holes. The hold of the arm sections in the holes is further improved by a detent depression formed in each of the semicircular arm sections.

DETAILED DESCRIPTION OF THE INVENTION

Figure 1:
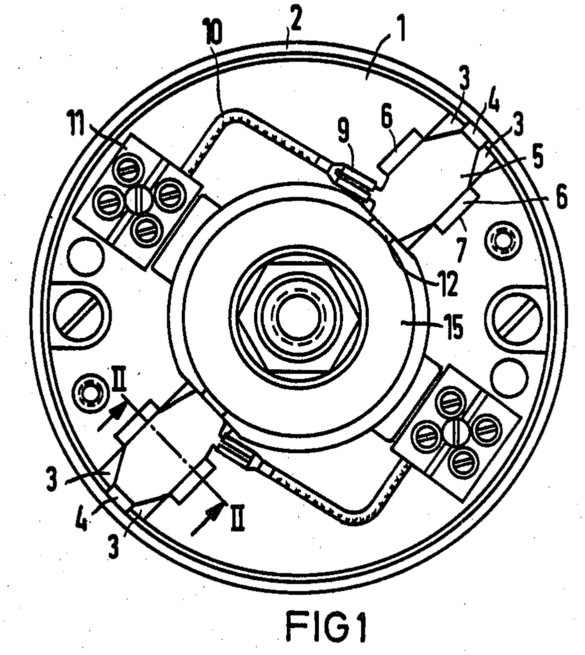
FIG. 1 is a top view onto the brush carrier of a tachometer generator fabricated in accordance with the teachings of the invention.

In FIG. 1, a brush carrier 1 is shown in place and fastened to the tachometer housing 2 of a tachometer generator. As may be seen also in FIG. 2, axially projecting ribs 3 form a channel 4 for each carbon brush. A plate-like brush holder 5 is seated on the ribs 3 of the channel 4 and is held in place by spreading arms 6, which engage in cut-outs 7 of the brush holder. Angled-off portions or tabs 8 are provided at the free ends of spreading arm portions 6 and extend laterally behind the brush carrier 1 on the other side of the cut-outs 7 and thereby hold the brush holder 5 securely. One or more connecting tabs 9 are provided on brush holder 5 for a plug or solder connection to an electric wire 10. The wire 10 can be brought directly to the outside of the housing or to terminals 11 which are fastened to the brush carrier 1.

Figure 2:
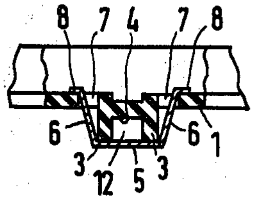
FIG. 2 is a view in partial cross-section of the brush carrier of FIG. 1, taken along the line II—II.

As can be seen from FIG. 2, the carbon brush 12 is inserted into the channel 4 formed by ribs 3 and closed by the plate portion of brush holder 5, ensuring good guidance and support. The spreading arms 6 are directed outward at an angle to the axis of the brush carrier 1. When the brush holder 5 is assembled onto the brush carrier 1, the spreading arms 6 are compressed so that angled-off portions 8 may pass through the cut-outs 7 on either side of the channel 4. When the spreading arms 6 are released, the angled-off portions 8 engage behind the wall of the brush carrier 1, securing the brush holder 5.

Figure 3:
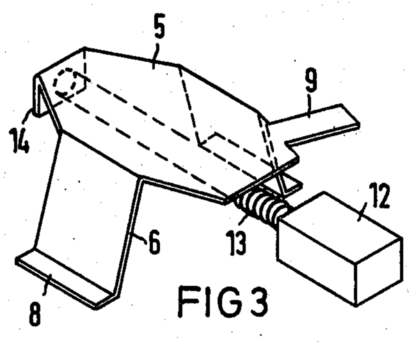
FIG. 3 is a perspective view of the brush holder of FIGS. 1 and 2, showing the spreading arms directed outward at an angle.

The perspective view of FIG. 3 shows brush holder 5 as well as the carbon brush 12 and the coil spring 13 connected to it. One of the transverse ends of brush holder 5 is bent from the plate to form an abutment tab 14 for the coil spring 13. The coil spring 13 is firmly connected to this abutment by soldering or welding. The carbon brush 12, the coil spring 13, and the brush holder 5 thus form an assembly or part which can be mounted as a unity.

Figure 4:
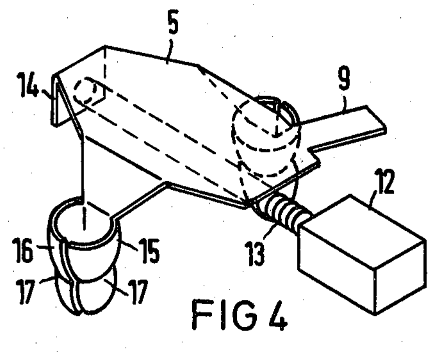
FIG. 4 is a perspective view of a brush holder having two semicircular arm sections for engaging the brush carrier in accordance with the teachings of the invention.

The brush holder shown in FIG. 4 differs from the one shown in FIG. 3 in that the spreading arms end in two semicircular arm sections 15 and 16 bent from the flat sheet around towards each other so that their ends are adjacent to each other, forming a substantially cylindrical shape. A detent depression 17 is formed in each arm section which cooperates with a corresponding profile of the cut-outs 7.

When a brush holder 5 of FIG. 3, for example, is assembled on the brush carrier 1, the carbon brush 12 is placed in the channel 4 and the brush holder is pushed radially inward; the carbon brush 12 comes to rest against the commutator 15 of the tachometer generator and the coil spring 13 is compressed accordingly. The brush holder 5 is pushed far enough so that the angled-off portions 8 lie over the cut-outs, compressing the spreading arms; the angled-off portions 8 are then brought through the cut-outs 7 as already described. The plate-shaped part of the brush holder 5 then rests on the ribs 3 and closes the channel 4 completely, so that not only the carbon brush 12 but also the coil spring 13 is guided on all sides.

What is claimed is:

1. In a tachometer generator having a brush carrier of insulating material which is fastened to the tachometer housing at the end face and which supports at least two brush holders each acting, together with the brush carrier, to form a brush guide for a carbon brush and its coil spring, each coil spring being braced against an abutment of the brush holder, there being means by which an electric wire can be connected to the brush holder, the improvement comprising:

a channel comprising axially projecting ribs formed on the brush carrier for guiding each brush, cut-outs in the brush carrier on the outside of the axially projecting ribs of each channel, and a plate-shaped brush holder resting on the axially projecting ribs of each channel and having axially projecting, laterally resilient, spreading arms axially directed into the cut-outs of the brush carrier and engaging the cut-outs in a snap-on connection, the brush holder having an abutment to which the coil spring is firmly connected.

2. In a tachometer generator in accordance with claim 1, the further improvement in which:

the spreading arms are directed outward at an angle to the direction of insertion and each has, at its free end, an angled-off portion, which points outward and lies parallel to the plate-shaped part of the brush holder, and the cut-outs of the brush carrier dimensioned to permit passage of the angled-off portions of the spreading arms when the spreading arms are compressed during assembly of the brush holder to the carrier.

3. In a tachometer generator in accordance with claim 1, the further improvement in which each spreading arm comprises semicircular arm sections in the form of a substantially cylindrical shape for engaging a cut-out.

4. In a tachometer generator in accordance with claim 3, the further improvement comprising at least one detent depression formed in each arm section for conformably engaging a cutout.

* * * * *